(12) United States Patent
Sano et al.

(10) Patent No.: US 7,936,507 B2
(45) Date of Patent: May 3, 2011

(54) SCREEN FOR PROJECTOR, PROCESS FOR PRODUCING SCREEN FOR PROJECTOR, AND PROJECTOR

(75) Inventors: Tsuyoshi Sano, Shiojiri (JP); Kiyohiko Takemoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 503 days.

(21) Appl. No.: 11/999,129

(22) Filed: Dec. 4, 2007

(65) Prior Publication Data

US 2008/0144172 A1    Jun. 19, 2008

(30) Foreign Application Priority Data

Dec. 4, 2006   (JP) .................................. 2006-327157
Apr. 25, 2007  (JP) .................................. 2007-115136
Apr. 25, 2007  (JP) .................................. 2007-115139
Apr. 25, 2007  (JP) .................................. 2007-115140

(51) Int. Cl.
*G03B 21/60*    (2006.01)
(52) U.S. Cl. ...................................... 359/459
(58) Field of Classification Search .................. 359/443, 359/459
See application file for complete search history.

(56) References Cited

U.S. PATENT DOCUMENTS

| 2,242,567 | A  | * | 5/1941  | Bodde ........................... 264/217 |
| 2,368,099 | A  | * | 1/1945  | Bodde ........................... 359/492 |
| 2,372,173 | A  | * | 3/1945  | Bodde, Jr. ..................... 359/489 |
| 4,792,209 | A  | * | 12/1988 | Laine et al. .................... 359/443 |
| 4,824,246 | A  | * | 4/1989  | Thornton, Jr. ............. 356/243.4 |
| 6,262,840 | B1 | * | 7/2001  | Watanabe et al. ............. 359/453 |
| 6,836,361 | B2 | * | 12/2004 | Hou ............................... 359/443 |
| 7,035,006 | B2 | * | 4/2006  | Umeya et al. ................. 359/443 |
| 7,224,525 | B2 | * | 5/2007  | Osawa .......................... 359/453 |
| 7,293,879 | B2 | * | 11/2007 | Ghozeil et al. .................. 353/79 |
| 2004/0095561 | A1 | * | 5/2004 | McDowell .................... 353/122 |
| 2005/0128581 | A1 | * | 6/2005 | Samuels et al. ............... 359/443 |

FOREIGN PATENT DOCUMENTS

| JP | 05142656 A  | * | 6/1993 |
| JP | 05-216123   |   | 8/1993 |
| JP | 2005-107375 |   | 4/2005 |

* cited by examiner

*Primary Examiner* — Christopher E Mahoney
*Assistant Examiner* — Leon W Rhodes
(74) *Attorney, Agent, or Firm* — John J. Penny; Nutter Mclennen & Fish LLP

(57) ABSTRACT

The invention relates to a screen for projectors which comprises a screen base in which at least two kinds of colorants selected from a colorant having an absorption wavelength region in 400 nm to 440 nm, a colorant having an absorption wavelength region in 470 nm to 510 nm, and a colorant having an absorption wavelength region in 570 nm to 610 nm are carried on the whole image display area of the screen base. Also disclosed are processes for producing the screen and projectors having the screen.

15 Claims, 5 Drawing Sheets

Wavelength (nm)

SCREEN FOR PROJECTOR, PROCESS FOR PRODUCING SCREEN FOR PROJECTOR, AND PROJECTOR

FIELD OF THE INVENTION

The present invention relates to a screen for projectors, processes for producing the screen for projectors, and projectors equipped with the screen for projectors.

BACKGROUND OF THE INVENTION

A projector has been known as a display capable of easily realizing a large screen. Known projector systems include: a front projector in which separated lights of three colors, i.e., red light (R), green light (G), and blue light (B), are allotted to respective liquid-crystal panels and images are projected and displayed on a reflection type screen; and a rear projector in which images are passed through and displayed on a transmission type screen.

As a result of the progress in luminance increase in these projector systems, the opportunity of viewing the screen in a well-lighted room is becoming frequent. However, when projected images (front projector) or transmitted images (rear projector) are viewed in a well-lighted environment, the external light form, e.g., a fluorescent lamp is reflected on the screen, making it impossible to obtain a sufficient image contrast. There has hence been a desire for a screen which can cut off external lights (see, for example, patent document 1). However, when an external light is thoughtlessly filtered, there are cases where the light component remaining after the filtering (i.e., reflected external light) colors the images to impair display characteristics.

Furthermore, a screen which has an absorption wavelength region in a wavelength range not including the central wavelengths of image lights and which has such light absorption characteristics that the external light not absorbed by the screen has a color temperature in the range of from 4,500 K to 7000 K (i.e., achromatic color) has also been proposed for the purpose of enabling high-contrast projected images free from coloration to be formed in a well-lighted environment (patent document 2).

[Patent Document 1] JP-A-5-216123
[Patent Document 2] JP-A-2005-107375

SUMMARY OF THE INVENTION

The present inventor made intensive investigations in order to develop a screen which, even when viewed in a well-lighted environment, is not influenced by external-light reflection and can display images with satisfactory color reproducibility, using an expedient different from that described in patent document 2. As a result, it was found that the problem described above can be overcome by using a combination of at least two kinds of colorants among a colorant having an absorption wavelength region in 400 nm to 440 nm, a colorant having an absorption wavelength region in 470 nm to 510 nm, and a colorant having an absorption wavelength region in 570 nm to 610 nm.

It was also found that when all the three colorants are used in combination or a specific printing technique is utilized, then the screen is not influenced by external-light reflection and can display images with more satisfactory color reproducibility.

The present invention is based on these findings.

Accordingly, the invention provides a screen for projectors which comprises a screen base having an image display area, wherein the screen base carries at least two kinds of colorants among a colorant having an absorption wavelength region in 400 nm to 440 nm, a colorant having an absorption wavelength region in 470 nm to 510 nm, and a colorant having an absorption wavelength region in 570 nm to 610 nm on the whole image display area thereof.

In one embodiment of the invention, at least a colorant having an absorption wavelength region in 470 nm to 510 nm and a colorant having an absorption wavelength region in 570 nm to 610 nm are used.

In another embodiment of the invention, at least a colorant having an absorption wavelength region in 400 nm to 440 nm and a colorant having an absorption wavelength region in 470 nm to 510 nm are used.

In still another embodiment of the invention, at least a colorant having an absorption wavelength region in 400 nm to 440 nm and a colorant having an absorption wavelength region in 570 nm to 610 nm are used.

In a preferred embodiment of the screen for projectors of the invention, the screen carries all the three colorants on the whole image display area of the screen base.

In another preferred embodiment of the screen for projectors of the invention, at least one of the colorants is contained in the state of being uniformly distributed over the whole image display area of the screen base.

In still another preferred embodiment of the screen for projectors of the invention, at least one of the colorants is contained in the state of being nonuniformly distributed over the whole image display area of the screen base. In this embodiment, it is more preferred that the concentration of the colorant in the state of being nonuniformly distributed should gradually increase concentrically from a central part of the image display area toward the periphery of the area.

In a further preferred embodiment of the screen for projectors of the invention, the colorants are each carried in the form of dot-shaped ink layers apart from each other or carried in the form of dot-shaped ink layers overlying each other at least partly.

In still a further preferred embodiment of the screen for projectors of the invention, the colorants are each carried in the form of solid-print ink layers which respectively contain the colorants separately.

In still a further preferred embodiment of the screen for projectors of the invention, the colorants are carried in the form of a single solid-print ink layer which simultaneously contains the colorants.

In still a further preferred embodiment of the screen for projectors of the invention, an image light is displayed by reflection or by transmission.

The invention further relates to a front projector or rear projector which includes the screen for projectors.

The invention still further relates to a process for producing a screen for projectors which comprises ejecting at least two kinds of ink compositions for ink-jet recording among an ink composition for ink-jet recording containing a colorant having an absorption wavelength region in 400 nm to 440 nm, an ink composition for ink-jet recording containing a colorant having an absorption wavelength region in 470 nm to 510 nm, and an ink composition for ink-jet recording containing a colorant having an absorption wavelength region in 570 nm to 610 nm to an image display area of a screen base by ink-jet recording.

In a preferred embodiment of the production process of the invention, all the three kinds of ink compositions for ink-jet recording are ejected to the image display area of the screen base by ink-jet recording.

In another preferred embodiment of the production process of the invention, at least one of the ink compositions for ink-jet recording is ejected so as to come into the state of being uniformly distributed over the whole image display area of the screen base.

In still another preferred embodiment of the production process of the invention, at least one of the ink compositions for ink-jet recording is ejected so as to come into the state of being nonuniformly distributed over the whole image display area of the screen base. In this embodiment, it is more preferred that the concentration of the colorant ejected so as to come into the state of being nonuniformly distributed should gradually increase from a central part of the image display area toward the periphery of the area.

In a further preferred embodiment of the production process of the invention, the ink compositions for ink-jet recording are each ejected so as to form dot-shaped ink layers apart from each other or so as to form dot-shaped ink layers overlying each other at least partly.

In still a further preferred embodiment of the production process of the invention, the ink compositions for ink-jet recording are each ejected in an arbitrary order to thereby form solid-print layers.

The invention furthermore relates to a process for producing a screen for projectors which comprises ejecting an ink composition for ink-jet recording containing at least two kinds of colorants among a colorant having an absorption wavelength region in 400 nm to 440 nm, a colorant having an absorption wavelength region in 470 nm to 510 nm, and a colorant having an absorption wavelength region in 570 nm to 610 nm to an image display area of a screen base by ink-jet recording.

In a preferred embodiment of this production process of the invention, an ink composition for ink-jet printing which contains all the three colorants is ejected.

In another preferred embodiment of the production process of the invention, the ink composition for ink-jet recording is ejected so that the concentration of colorants comes into the state of being uniformly distributed over the whole image display area of the screen base.

In still another preferred embodiment of the production process of the invention, the ink composition for ink-jet recording is ejected so that the concentration of colorants comes into the state of being nonuniformly distributed over the whole image display area of the screen base. In this embodiment, it is more preferred that the concentration of colorants should gradually increase concentrically from a central part of the image display area toward the periphery of the area.

The invention furthermore relates to a process for producing a screen for projectors which comprises ejecting an ink composition for ink-jet recording containing two kinds of colorants among a colorant having an absorption wavelength region in 400 nm to 440 nm, a colorant having an absorption wavelength region in 470 nm to 510 nm, and a colorant having an absorption wavelength region in 570 nm to 610 nm, and an ink composition for ink-jet recording containing a colorant not contained in said ink composition for ink-jet recording to an image display area of a screen base by ink-jet recording.

In a preferred embodiment of this production process of the invention, at least one of the ink compositions for ink-jet recording is ejected so that the ink composition comes into the state of being uniformly distributed over the whole image display area of the screen base.

In another preferred embodiment of the production process of the invention, at least one of the ink compositions for ink-jet recording is ejected so that the ink composition comes into the state of being nonuniformly distributed over the whole image display area of the screen base. In this embodiment, it is more preferred that the concentration of the colorant ejected so as to come into a nonuniformly distributed state should gradually increase concentrically from a central part of the image display area toward the periphery of the area.

In still another preferred embodiment of the production process of the invention, the ink compositions for ink-jet recording are each ejected so as to form dot-shaped ink layers apart from each other or so as to form dot-shaped ink layers overlying each other at least partly.

In a further preferred embodiment of the production process of the invention, the ink compositions for ink-jet recording are each ejected in an arbitrary order to thereby form solid-print layers.

In the screen for projectors of the invention and the projectors and production processes of the invention, the embodiments in which at least a colorant having an absorption wavelength region in 470 nm to 510 nm and a colorant having an absorption wavelength region in 570 nm to 610 nm are used are referred to "first embodiments of the invention", the embodiments in which at least a colorant having an absorption wavelength region in 400 nm to 440 nm and a colorant having an absorption wavelength region in 470 nm to 510 nm are used are referred to "second embodiments of the invention", and the embodiments in which at least a colorant having an absorption wavelength region in 400 nm to 440 nm and a colorant having an absorption wavelength region in 570 nm to 610 nm are used are referred to "third embodiments of the invention".

In this description, the term "colorant having an absorption wavelength region in 470 nm to 510 nm" means that most of the absorption wavelength region shown by the colorant is present within "470 nm to 510 nm". The phrase "most of" means not only the case where the absorption region is wholly present within "470 nm to 510 nm" as shown in FIG. 1 (a), but also means that when the whole absorption region of the colorant is converted to area, then the proportion of the absorption wavelength region (A) within "470 nm to 510 nm" to the sum of the absorption wavelength region (B) below "470 nm", the absorption wavelength region (C) exceeding "510 nm", and the above-mentioned absorption wavelength region (A) in "470 nm to 510 nm", is 70% or larger, i.e., that the proportion (S) calculated with the following calculation formula (1):

$$S=[A/(A+B+C)]\times 100 \quad (1)$$

is 70% or larger, as shown in FIG. 1 (b) to FIG. 1 (d).

Likewise, the term "colorant having an absorption wavelength region in 570 nm to 610 nm" means that most of the absorption wavelength region shown by the colorant is present within "570 nm to 610 nm", and the phrase "most of" means that when the whole absorption region is converted to area, at least 70% of the region is present within that wavelength region.

Furthermore, the term "colorant having an absorption wavelength region in 400 nm to 440 nm" means that most of the absorption wavelength region shown by the colorant is present within "400 nm to 440 nm", and the phrase "most of" means that when the whole absorption region is converted to area, at least 70% of the region is present within that wavelength region.

The screen for projectors of the invention carries, as shown in FIG. 2, at least two kinds of colorants selected among:

a colorant having an absorption wavelength region in 400 nm to 440 nm, i.e., a colorant having an absorption wavelength region [e.g., curve V in FIG. 2] in a region on the shorter-wavelength side of the wavelength region of blue light (B) [curve (B) in FIG. 2] [hereinafter, this colorant may be referred to as "colorant V"], a colorant having an absorption wavelength region in 470 nm to 510 nm, i.e., a colorant having an absorption wavelength region [e.g., curve BG in FIG. 2] in a region between the wavelength region of blue light (B) [curve (B) in FIG. 2] and the wavelength region of green light (G) [curve (G) in FIG. 2] [hereinafter, this colorant may be referred to as "colorant BG"], and a colorant having an absorption wavelength region in 570 nm to 610 nm, i.e., a colorant having an absorption wavelength region [e.g., curve GR in FIG. 2] in a region between the wavelength region of green light (G) [curve (G) in FIG. 2] and the wavelength region of red light (R) [curve (R) in FIG. 2] [hereinafter, this colorant may be referred to as "colorant GR"], over the whole image display area of the screen base in the state of being uniformly or nonuniformly distributed therein. Because of this, light components other than the spectral components for image display [i.e., three colors of red light (R), green light (G), and blue light (B)] can be completely absorbed. Consequently, even when the screen is viewed in a well-lighted environment, it is not influenced by external-light reflection and can display images with satisfactory color reproducibility.

Furthermore, when the screen for projectors of the invention carries all of the three kinds of colorants, i.e., the colorant V, the colorant BG, and the colorant GR, in the state of being uniformly or nonuniformly distributed over the whole image display area of the screen base, then light components other than the spectral components for image display [i.e., three colors of red light (R), green light (G), and blue light (B)] can be more completely absorbed. Consequently, even when the screen is viewed in a well-lighted environment, it is not influenced by external-light reflection and can display images with more satisfactory color reproducibility.

Figure 1:
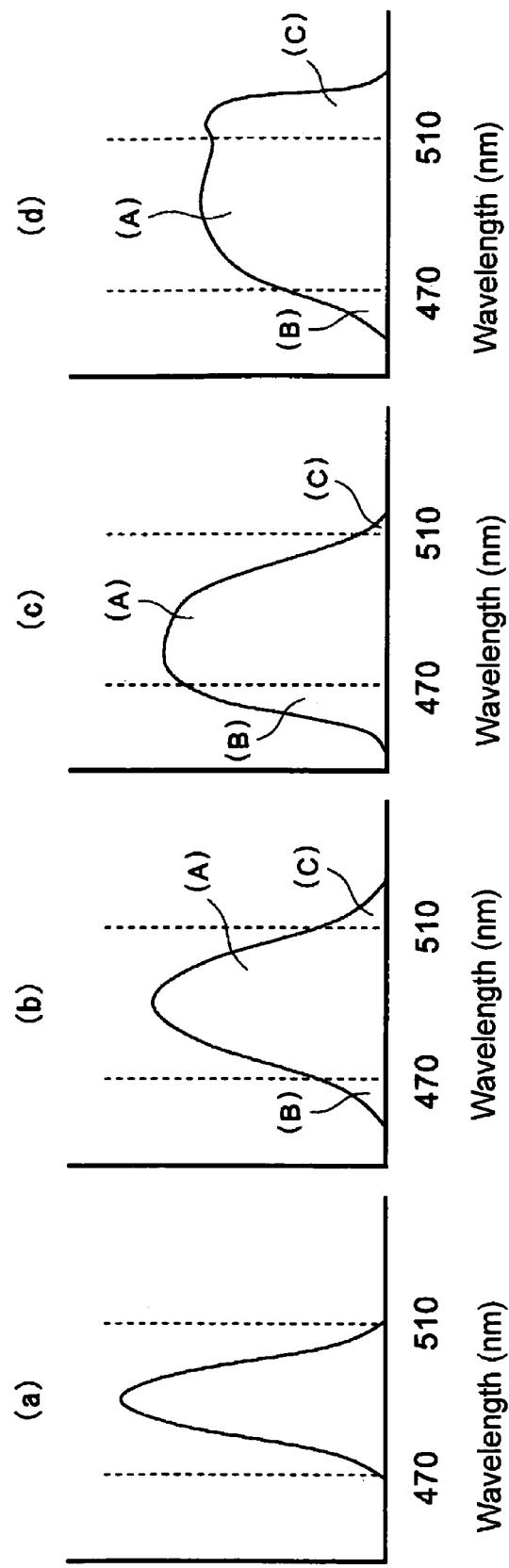
FIG. 1 are diagrammatic views illustrating the absorption wavelength regions of three colorants for use in the invention.
Figure 2:
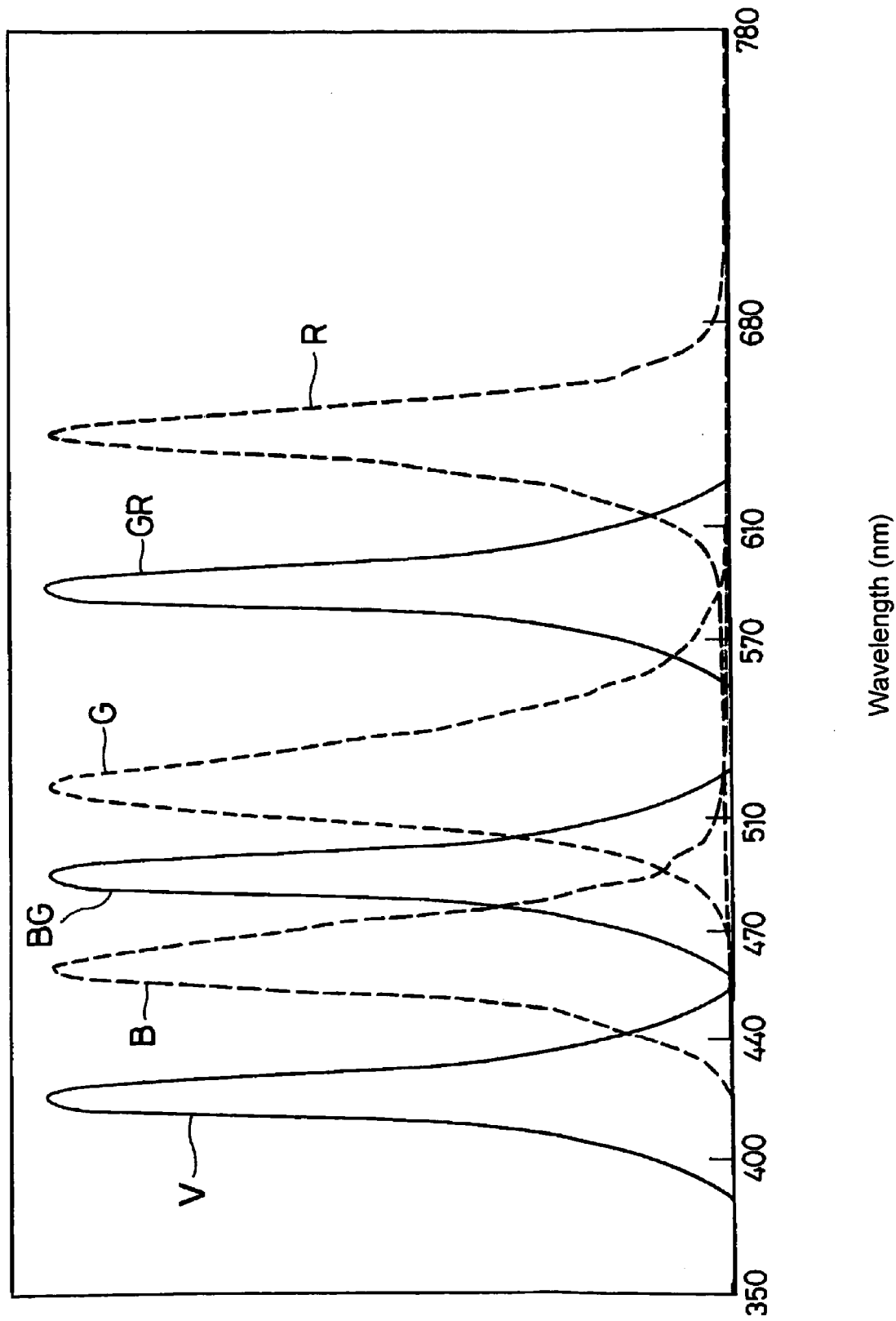
FIG. 2 is a diagrammatic view illustrating the wavelength regions of blue light (B), green light (G), and red light (R) and the wavelength regions of the colorant BG, colorant GR, and colorant V for use in the invention.

The reference numerals and signs used in the drawings denote the following, respectively.

1: Illuminator;
2: Light source;
3, 4: Fly eye lens;
7: Lamp;
8: Reflector;
13, 14: Dichroic mirror;
15, 16, 17: Reflection mirror;
18, 19, 20: Relay lens;
21: Relay system;
22, 23, 24: Liquid-crystal light valve;
25: Cross dichroic prism;
26: Projection lens;
30: Front projector;
40, 50, 60: Screen;
41, 51, 61: Reflection type screen base;
42, 43: Dot-shaped ink layer;
52, 53, 64: Ink layer;
55: Back projection type projector;
56: Reflection mirror;
60a: Optical axis;
65: Transmission type screen;
100: Rear projector.

DETAILED DESCRIPTION OF THE INVENTION

The invention will be explained below in detail by reference to the first embodiments of the invention, in which at least a colorant BG and a colorant GR are used and a colorant V may be used as an optional ingredient. However, the following explanation similarly applies to the second embodiments (in which at least a colorant V and a colorant BG are used and a colorant GR is an optional ingredient) and third embodiments (in which at least a colorant V and a colorant GR are used and a colorant BG is an optional ingredient) of the invention, except that the colorants are replaced according to the embodiments.

[Screen]

Figure 3:
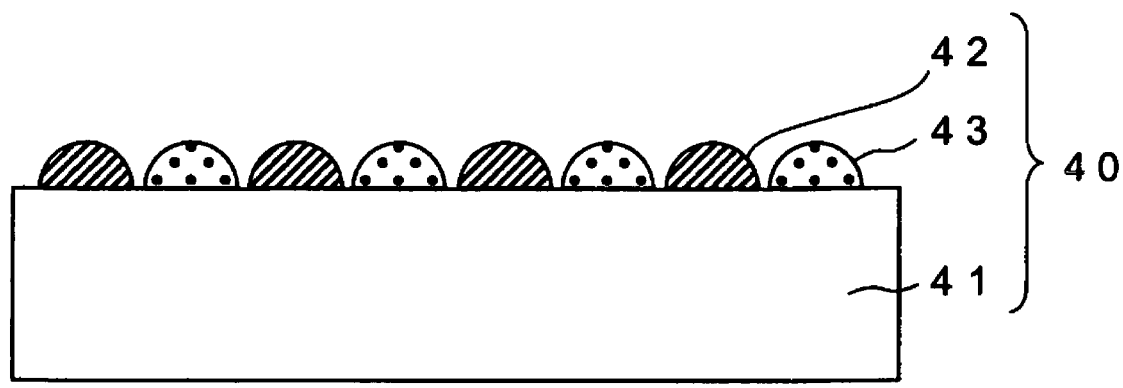
FIG. 3 is a diagrammatic sectional view illustrating the structure of a reflection type screen according to the invention which comprises a reflection type screen base and at least two kinds of colorant-containing dot-shaped ink layers carried on the surface of the base.
Figure 4:
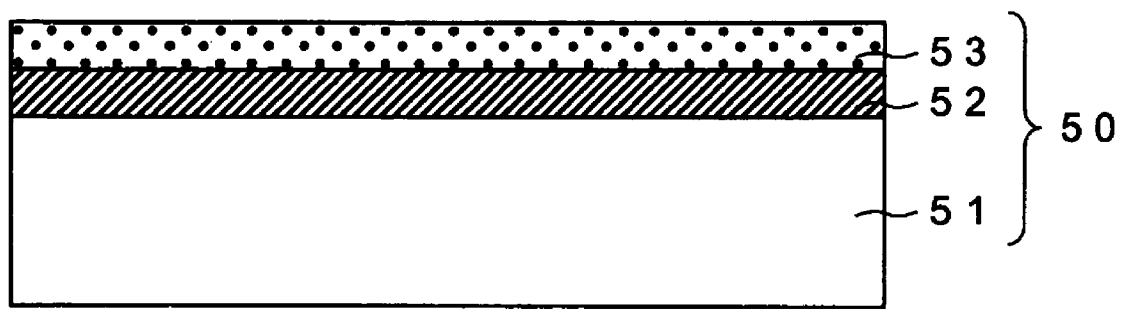
FIG. 4 is a diagrammatic sectional view illustrating the structure of a reflection type screen according to the invention which comprises a reflection type screen base and a stack of at least two kinds of colorant-containing ink layers carried on the surface of the base.
Figure 5:
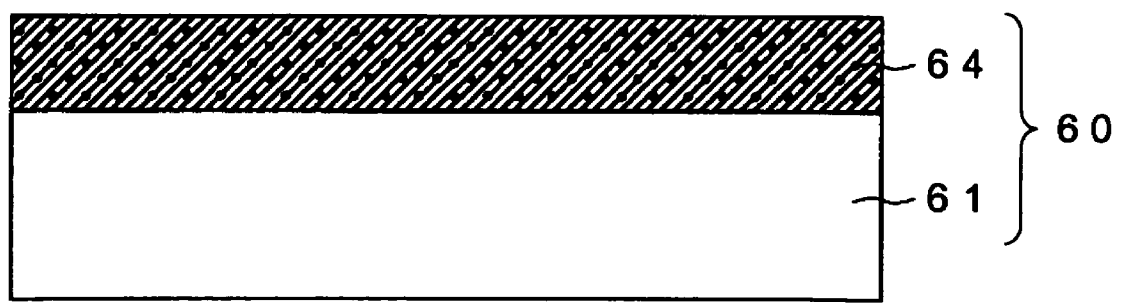
FIG. 5 is a diagrammatic sectional view illustrating the structure of a reflection type screen according to the invention which comprises a reflection type screen base and an ink layer containing at least two kinds of colorants carried on the surface of the base.

Typical embodiments of the screen for projectors according to the invention are diagrammatically shown in FIG. 3 to FIG. 5.

FIG. 3 is a diagrammatic sectional view of a screen 40 for front projectors which comprises a reflection type screen base 41 and, uniformly and regularly carries, on the reflection-side surface of the whole image display area thereof, a dot-shaped ink layer 42 containing a colorant BG having an absorption wavelength region in 470 nm to 510 nm and a dot-shaped ink layer 43 containing a colorant GR having an absorption wavelength region in 570 nm to 610 nm, in the first embodiments of the invention. The dots of one dot-shaped ink layer 42 are uniformly and dispersedly distributed over the whole image display area of the screen base independently of the dots of the other dot-shaped ink layer 43, while the dots of this dot-shaped ink layer 43 are uniformly and dispersedly distributed over the whole image display area of the screen base independently of the dots of that dot-shaped ink layer 42. The dot-shaped ink layer 42 and the dot-shaped ink layer 43 not only can be independently formed so as to be apart from each other as shown in FIG. 3, but also may be formed so that the dot-shaped ink layers overlie each other partly or wholly. Furthermore, although it is preferred that each dot-shaped ink layer should have been regularly disposed, the disposition need not be precisely regular and the ink layer may have been randomly disposed.

In the reflection type screen base 41, either or both of the dots of the dot-shaped ink layer 42 and the dots of the dot-shaped ink layer 43 can be included so that the dots are in the state of being nonuniformly distributed over the whole image display area of the screen base. The term the state of being nonuniformly distributed means, for example, that the concentration of the colorant gradually (i.e., continuously or step-wise) changes concentrically from a central part of the image display area toward the periphery of the area. For example, that term means that the concentration becomes low or, preferably, becomes high. Techniques for changing the concentration of a colorant are not particularly limited. Examples thereof include: a method in which the dot diameter (ejection amount) is changed; a method in which the density of dots having the same diameter (dots formed with the same ejection amount) per unit area is changed; and a method in which ink compositions differing in colorant content are used.

Besides the dot-shaped ink layer 42 and the dot-shaped ink layer 43, a dot-shaped ink layer containing a colorant V having an absorption wavelength region in 400 nm to 440 nm (not shown) may be included so that this layer is uniformly and either regularly or randomly carried or is nonuniformly carried on the reflection-side surface of the whole image display area of the reflection type screen base 41. The dot-shaped ink layer containing a colorant V also not only can be independently formed so as to be apart from the dot-shaped ink layer 42 and dot-shaped ink layer 43 as shown in FIG. 3, but also may be formed so that this dot-shaped ink layer overlies the other ink layers partly or wholly.

According to need, a protective layer may be formed over the dot-shaped ink layer 42 and dot-shaped ink layer 43 (and over the dot-shaped ink layer containing a colorant V, when this layer is present). Alternatively, the dot-shaped ink layer 42 and dot-shaped ink layer 43 (and the dot-shaped ink layer containing a colorant V when desired) may be formed on a protective layer formed over a one-side surface of the reflection type screen base 41. By forming a protective layer, the dot-shaped ink layer 42 and dot-shaped ink layer 43 (and the dot-shaped ink layer containing a colorant V when this layer is formed) can be tightly carried on the reflection type screen base 41. Incidentally, the dot-shaped ink layer 42 should contain no colorant except the colorant BG, and the dot-shaped ink layer 43 should contain no colorant except the colorant GR. Likewise, the dot-shaped ink layer containing a colorant V should contain no colorant except the colorant V.

A transmission type screen base may be used, in place of the reflection type screen base 41 shown in FIG. 3, to carry a dot-shaped ink layer containing a colorant BG having an absorption wavelength region in 470 nm to 510 nm and a dot-shaped ink layer containing a colorant GR having an absorption wavelength region in 570 nm to 610 nm on a one-side surface of the transmission type screen base independently of each other as shown in FIG. 3. Thus, a screen for rear projectors can be obtained. According to need, a dot-shaped ink layer containing a colorant V (not shown) may be further formed. These dot-shaped ink layers can be included in the state of being uniformly or nonuniformly distributed over the whole image display area of the screen base. In these cases, the surface on which the dot-shaped ink layers are to be formed may be either of the surfaces of the transmission type screen base (i.e., either of the surface on the image light incidence side and the surface on the image light transmission side) or each of the surfaces. In the case where one or more dot-shaped ink layers are to be formed on each side of a transmission type screen base, a dot-shaped ink layer containing a colorant BG (and according to need, a dot-shaped ink layer containing a colorant V) may be formed on one surface and a dot-shaped ink layer containing a colorant GR (and according to need, a dot-shaped ink layer containing a colorant V) may be formed on the other surface. Furthermore, a protective layer may be formed over the dot-shaped ink layers. Alternatively, the dot-shaped ink layers may be formed on a protective layer formed over the surface on one side or each side of a transmission type screen base.

FIG. 4 is a diagrammatic sectional view of a screen 50 for front projectors which comprises a reflection type screen base 51 and, having carried on the reflection-side surface of the whole image display area thereof in the following order, an ink layer 52 containing a colorant BG and an ink layer 53 containing a colorant GR, in the first embodiments of the invention. It is also possible to form a colorant-GR-containing ink layer 53 on the reflection-side surface of a reflection type screen base 51 and then form a colorant-BG-containing ink layer 52 thereon. It is preferred that the ink layer 52 containing a colorant BG and the ink layer 53 containing a colorant GR should be formed so as to be in direct contact with each other without separating the two layers from each other.

The ink layer 52 containing a colorant BG and the ink layer 53 containing a colorant GR may be included so that the colorant concentration of either or each of the ink layers 52 and 53 is in the state of being uniformly distributed or nonuniformly distributed over the whole image display area of the screen base. The term the state of being nonuniformly distributed means that the concentration of the colorant, for example, gradually (i.e., continuously or step-wise) changes concentrically from a central part of the image display area toward the periphery of the area. For example, that term means that the concentration becomes low or, preferably, becomes high. Techniques for changing the concentration of a colorant are not particularly limited. Examples thereof include: a method in which when solid printing is conducted by ink-jet recording, the amount of the ink to be ejected per unit area is changed; and a method in which ink compositions differing in colorant content are used.

Besides the ink layer 52 containing a colorant BG and the ink layer 53 containing a colorant GR, an ink layer containing a colorant V having an absorption wavelength region in 400 nm to 440 nm (not shown) may be included so that these ink layers are carried in an arbitrary order on the reflection-side surface of the whole image display area of the reflection type screen base 51.

In the case where the three colorants, i.e., the colorant BG, colorant GR, and colorant V, are used, these colorants may be carried in the form of a two-layer structure composed of an ink layer containing two of these colorants and an ink layer containing the remaining one colorant. In the case where the three colorants are to be carried as such a two-layer structure, the colorant concentration of each layer can be in the state of being uniformly distributed or nonuniformly distributed over the whole image display area of the screen base.

According to need, a protective layer may be formed over or between the ink layer 52 containing a colorant BG and the ink layer 53 containing a colorant GR and, optionally, the ink layer containing a colorant V (the order of superposition over the base 51 is not limited). Alternatively, the ink layer 52 containing a colorant BG and the ink layer 53 containing a colorant GR and, optionally, the ink layer containing a colorant V (the order of superposition over the base 51 is not limited) may be formed on a protective layer formed over a one-side surface of the reflection type screen base 51. Incidentally, the ink layer 52 containing a colorant BG should contain no colorant except the colorant BG, and the ink layer 53 containing a colorant GR should contain no colorant except the colorant GR. Likewise, the ink layer containing a colorant V should contain no colorant except the colorant V.

A transmission type screen base may be used, in place of the reflection type screen base 51 shown in FIG. 4, to form an ink layer containing a colorant BG and an ink layer containing a colorant GR on a one-side surface of the transmission type screen base in a multilayer arrangement as shown in FIG. 4. Thus, a screen for rear projectors can be obtained. According to need, an ink layer containing a colorant V (not shown) may be further formed. In these cases, the surface on which the ink layers are to be formed may be either of the surfaces of the transmission type screen base (i.e., either of the surface on the image light incidence side and the surface on the image light transmission side) or each of the surfaces. In the case where one or more ink layers are to be formed on each side of a transmission type screen base, an ink layer containing a colorant BG (and according to need, an ink layer containing a colorant V) may be formed on one surface and an ink layer containing a colorant GR (and according to need, an ink layer containing a colorant V) may be formed on the other surface. Furthermore, a protective layer may be formed over the two ink layers. Alternatively, the two ink layers may be formed on a protective layer formed over the surface on one side or each side of a transmission type screen base.

FIG. 5 is a diagrammatic sectional view of a screen 60 for front projectors which comprises a reflection type screen base 61 and, having carried on the reflection-side surface of the whole image display area thereof, an ink layer 64 containing both a colorant BG and a colorant GR. According to need, the ink layer 64 can contain a colorant V having an absorption wavelength region in 400 nm to 440 nm. The concentration of each colorant in the ink layer 64 may be even throughout the whole image display area of the screen base or may be uneven. The term "concentration is uneven" means, for example, that the concentration gradually (i.e., continuously or step-wise) changes concentrically from a central part of the image display area toward the periphery of the area. For example, that term means that the concentration becomes low or, preferably, becomes high. Techniques for changing the concentration of a colorant are not particularly limited. Examples thereof include: a method in which when solid printing is conducted by ink-jet printing, the amount of the ink to be ejected per unit area is changed; and a method in which ink compositions differing in colorant content are used.

According to need, a protective layer may be formed over the ink layer 64. Alternatively, the ink layer 64 may be formed on a protective layer formed over a one-side surface of the reflection type screen base 61. Incidentally, the ink layer 64 should contain no colorant except the colorant BG and the colorant GR.

A transmission type screen base may be used, in place of the reflection type screen base 61 shown in FIG. 5, to carry an ink layer containing both a colorant BG and a colorant GR on a one-side surface of the transmission type screen base as shown in FIG. 5. Thus, a screen for rear projectors can be obtained. In this case, the surface on which the ink layer is to be formed may be either of the surfaces of the transmission type screen base (i.e., either of the surface on the image light incidence side and the surface on the image light transmission side) or each of the surfaces. Furthermore, a protective layer may be formed over the ink layer. Alternatively, the ink layer may be formed on a protective layer formed over the surface on one side or each side of a transmission type screen base.

In the first embodiments of the invention, the colorant BG and colorant GR and, optionally, a colorant V may be carried on the surface of the whole image display area of a reflection type screen base or transmission type screen base so as to form one or more dot-shaped ink layers as shown in FIG. 3 and one or more solid-print ink layers as shown in FIG. 4 or FIG. 5 in combination.

[Colorants]

In the first embodiments of the invention, use is made of a colorant having an absorption wavelength region in 470 nm to 510 nm, i.e., a colorant having an absorption wavelength region in the range between blue light (B) and green light (G) [colorant BG], and a colorant having an absorption wavelength region in 570 nm to 610 nm, i.e., a colorant having an absorption wavelength region in the range between green light (G) and red light (R) [colorant GR]. Such colorant BG and colorant GR each are known, and can be synthesized by known methods. Alternatively, commercial products can be used. In the first embodiments of the invention, a colorant having an absorption wavelength region in 400 nm to 440 nm, i.e., a colorant having an absorption wavelength region in a range on the shorter-wavelength side of the wavelength region of blue light (B) (colorant V), may be used besides the colorant BG and the colorant GR. The colorant V is known and can be synthesized by a known method. Alternatively, a commercial product can be used.

[Screen Bases]

The reflection type screen base for use in the screen for front projectors may be constituted of a light-reflecting material in general use as this kind of screen base. Over this reflection type screen base according to the first embodiments of the invention, known functional layers such as, e.g., a light-diffusing layer can be formed besides an ink layer containing a colorant BG and an ink layer containing a colorant GR (and optionally an ink layer containing a colorant V).

The transmission type screen base for use in the screen for rear projectors may be constituted of a light-transmitting material in general use as this kind of screen base (e.g., a glass or transparent plastic). Over this transmission type screen base according to the first embodiments of the invention, known functional layers such as, e.g., a light-diffusing layer can be formed besides an ink layer containing a colorant BG and an ink layer containing a colorant GR (and optionally an ink layer containing a colorant V).

[Process for Producing Screen Base]

The screen base according to the first embodiments of the invention can be produced by ejecting an ink composition for ink-jet recording containing a colorant having an absorption wavelength region in 470 nm to 510 nm (colorant BG) and an ink composition for ink-jet recording containing a colorant having an absorption wavelength region in 570 nm to 610 nm (colorant GR) and optionally a colorant having an absorption wavelength region in 400 nm to 440 nm (colorant V) to an image display area of the screen base by ink-jet recording.

Those ink compositions can be ejected independently of each other so as to come into the state of being uniformly distributed over the whole image display area of the screen base or into the state of being nonuniformly distributed, and can be ejected in a dot-shaped arrangement or in a solid-print arrangement. In the processes for producing the screen base according to the first embodiments of the invention, use is made of ink compositions for ink-jet recording which respectively contain the colorant BG, the colorant GR, and the colorant V as an optional colorant and contain substantially no colorant except these. Alternatively, use is made of an ink composition for ink-jet recording which contains two or three colorants comprising the colorant BG and the colorant GR and optionally including the colorant V. Furthermore, two or more ink compositions for ink-jet recording may be used which differ in the content of each of the colorant BG and the colorant GR and optionally the colorant V.

[Projector System]

An explanation is then given on a liquid-crystal projector system as one example of projector systems equipped with the screen of the invention.

Figure 6:
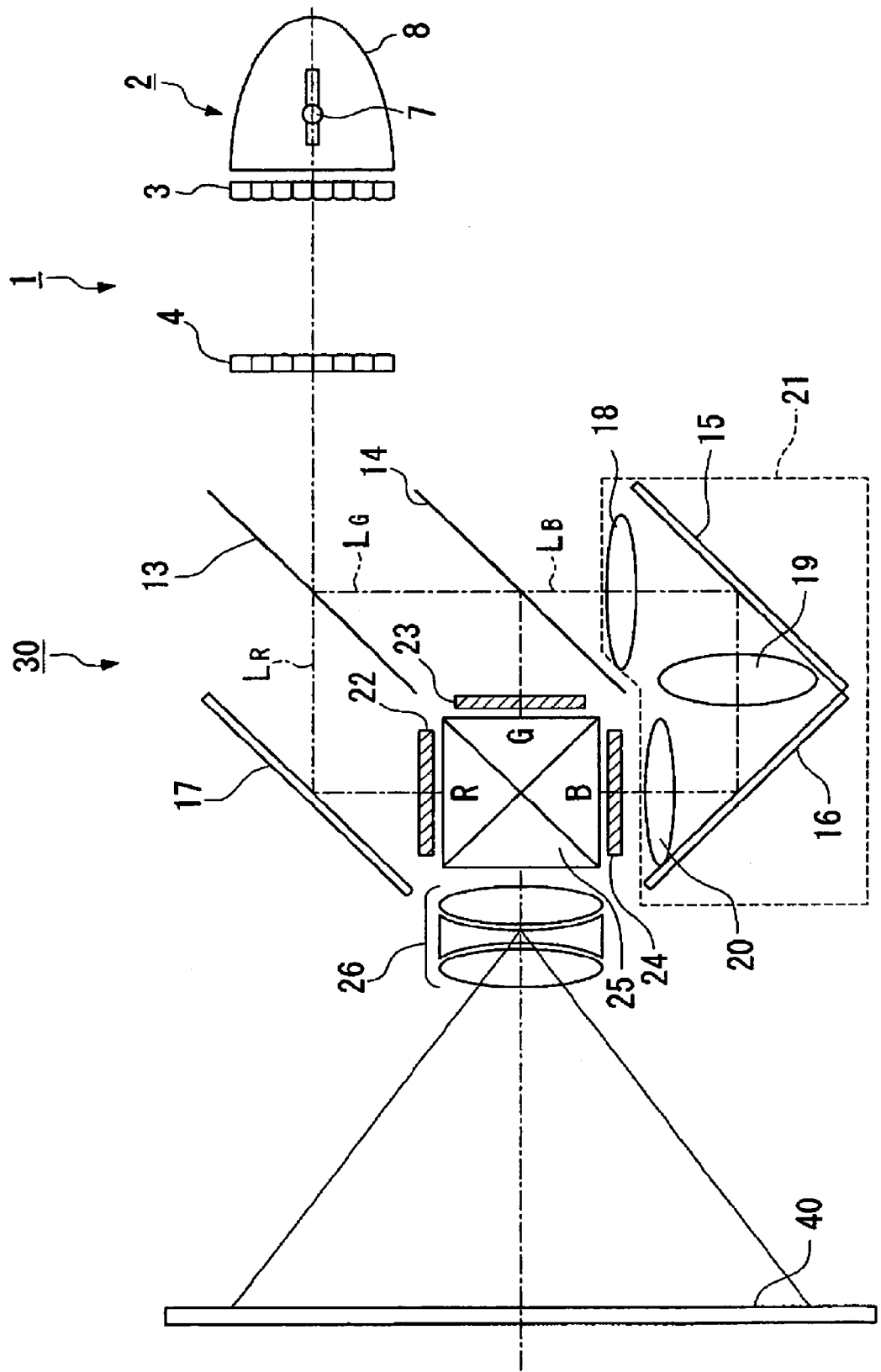
FIG. 6 is a schematic view showing the constitution of a front projector system equipped with a reflection type screen of the invention.

FIG. 6 is a schematic view showing the constitution of a projector 30. The projector 30 shown as an embodiment in FIG. 6 is a three-plate type color liquid-crystal projector equipped with transmission type liquid-crystal light valves respectively for different colors, i.e., red light (R), green light (G), and blue light (B). This projector 30 has an illuminator 1, a light source 2, fly eye lenses 3 and 4 as a device for evening illumination, dichroic mirrors 13 and 14, reflection mirrors 15, 16, and 17, liquid-crystal light valves 22, 23, and 24 as a light modulator, a cross dichroic prism 25, and a projection lens 26 as a projection device. It is further equipped with the screen 40 (see FIG. 3) according to the invention as a receiving member which receives image lights projected by the projector 30. This projector 30 and the screen 40 constitute a projector system of the invention. The screen 50 shown in FIG. 4 or the screen 60 shown in FIG. 5 may be used in place of the screen 40.

The illuminator 1 is constituted of the light source 2 and the fly eye lenses 3 and 4. The light source 2 is constituted of a lamp 7, e.g., a high-pressure mercury lamp, and a reflector 8 which reflects the light from the lamp 7. The first fly eye lens 3 and the second fly eye lens 4 have been successively disposed from the light source 2 side as illumination-evening devices for evening a light-source illuminance distribution at the liquid-crystal light valves 22, 23, and 24, which are the regions to be illuminated. The first fly eye lens 3 forms secondary light-source images, while the second fly eye lens 4 functions as a superimposing lens to superimpose these images in the light valve positions. According to need, a condenser lens for superimposing the secondary light-source images may be disposed either in the position of the second fly eye lens 4 or after the lens 4.

The dichroic mirror 13 for blue light/green light reflection serves to transmit red light $L_R$ among the light beams from the light source 2 and reflect blue light $L_B$ and green light $L_G$. The red light $L_R$ which has passed through the dichroic mirror 13 is reflected by the reflection mirror 17 and strikes on the liquid-crystal light valve 22 for red light. On the other hand, the green light $L_G$ among the color lights reflected by the dichroic mirror 13 is reflected by the dichroic mirror 14 for green light reflection and strikes on the liquid-crystal light valve 23 for green light. On the other hand, the blue light $L_B$ passes also through the dichroic mirror 14 and strikes on the liquid-crystal light valve 24 for blue light via a relay system 21 comprising a relay lens 18, reflection mirror 15, relay lens 19, reflection mirror 16, and relay lens 20.

The three color lights (color image lights) modulated respectively with the liquid-crystal light valves 22, 23, and 24 strike on the cross dichroic prism 25. This prism has a structure made up of four rectangular prisms bonded together. A dielectric multilayer film which reflects red light and a dielectric multilayer film which reflects blue light have been formed on the inner surfaces of the prism 25 in a cross arrangement. The three color lights are compounded together by means of these dielectric multilayer films to give a light forming a color image (image light). The light formed by compounding is caused to strike on the screen 27 by the projection lens, which is an optical projection system, to display an enlarged image.

[Rear Projector]

An example of rear projectors equipped with the transmission type screen of the invention is explained below by reference to FIG. 7.

Figure 7:
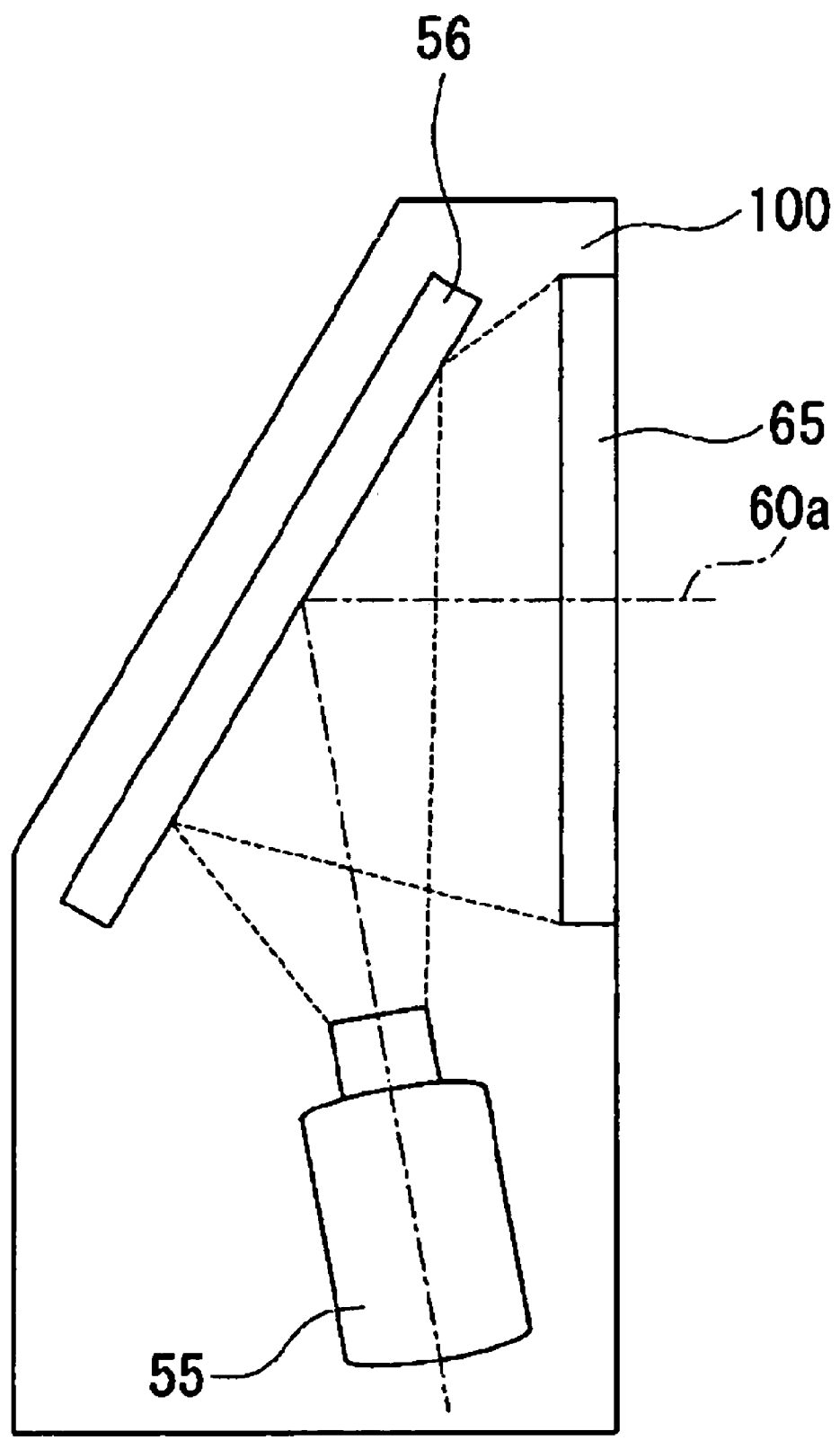
FIG. 7 is a schematic view showing the constitution of a rear projector system equipped with a transmission type screen of the invention.

FIG. 7 is a schematic view showing the constitution of a projector 100. The rear projector 100 shown as an embodiment in FIG. 7 comprises a back projection type projector 55 which forms an image light and transmits/projects the light, a transmission type screen 65 according to the invention for displaying the projected image, and a reflection mirror 56 for reflecting the image light emitted from the back projection type projector 55 and leading it to the transmission type screen 65. The back projection type projector 55 comprises a light source device, image-forming optical system, projection lens, etc. which are not shown, and serves to form and emit a projected light. This projected light reaches the reflection mirror 56 while expanding, is reflected by the reflection mirror 56, and reaches the transmission type screen 65. This transmission type screen 65 can transmit only the original projected light in the state of being nearly parallel with the optical axis 60a and display the transmitted light as an image.

The screen for projectors according to the invention can be used in a front projector as a reflection type screen on which images are projected and displayed, or in a rear projector as a transmission type screen which transmits and displays images.

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2006-327157 (filed Dec. 4, 2006), 2007-115136 (filed Apr. 25, 2007), 2007-115139 (filed Apr. 25, 2007) and 2007-115140 (filed Apr. 25, 2007), and the contents thereof are herein incorporated by reference.

What is claimed is:

1. A screen for projectors which comprises a screen base having an image display area, wherein the screen base carries at least two kinds of colorants, among a colorant having an absorption wavelength region of 400 nm to 440 nm, a colorant having an absorption wavelength region of 470 nm to 510 nm, and a colorant having an absorption wavelength region of 570 nm to 610 nm, on a whole image display area thereof; wherein
    at least one of the colorants is non-uniformly distributed over the whole image display area, whereby a concentration of the at least one of the colorants gradually increases concentrically from a central part of the image display area toward a periphery part of the image display area.

2. The screen for projectors according to claim 1, wherein the at least two kinds of colorants are a colorant having an absorption wavelength region in 470 nm to 510 nm and a colorant having an absorption wavelength region in 570 nm to 610 nm.

3. The screen for projectors according to claim 1, wherein the at least two kinds of colorants are a colorant having an absorption wavelength region in 400 nm to 440 nm and a colorant having an absorption wavelength region in 470 nm to 510 nm.

4. The screen for projectors according to claim 1, wherein the at least two kinds of colorants are a colorant having an absorption wavelength region in 400 nm to 440 nm and a colorant having an absorption wavelength region in 570 nm to 610 nm.

5. The screen for projectors according to claim 1, wherein the screen base carries the three kinds of colorants on the whole image display area thereof.

6. The screen for projectors according to claim 1, wherein at least one of the colorants is contained in the state of being uniformly distributed over the whole image display area of the screen base.

7. The screen for projectors according to claim 1, wherein the colorants are each carried in the form of dot-shaped ink layers apart from each other or carried in the form of dot-shaped ink layers overlying each other at least partly.

8. The screen for projectors according to claim 1, wherein the colorants are each carried in the form of solid-print ink layers which respectively contain the colorants separately.

9. The screen for projectors according to claim 1, wherein the colorants are carried in the form of a single solid-print ink layer which simultaneously contains the colorants.

10. The screen for projectors according to claim 1, which displays an image light by reflection.

11. The screen for projectors according to claim 1, which displays an image light by transmission.

12. A front projector including the screen for projectors according to claim 10.

13. A rear projector including the screen for projectors according to claim 11.

14. The screen for projectors according to claim 1, wherein the concentration of the at least one of the colorants increases by varying a dot diameter of the at least one of the colorants.

15. The screen for projectors according to claim 1, wherein the concentration of the at least one of the colorants increases by varying a dot density per unit area of the at least one of the colorants.

* * * * *